(12) United States Patent
Wang

(10) Patent No.: US 11,878,791 B2
(45) Date of Patent: Jan. 23, 2024

(54) AIR VEHICLE WITH DOUBLE-LAYER ROTOR WING STRUCTURE

(71) Applicant: Guangdong Guoshijian Technology Development Co., Ltd., Guangdong (CN)

(72) Inventor: Zhicheng Wang, Guangdong (CN)

(73) Assignee: Guangdong Guoshijian Technology Development Co., Ltd

( * ) Notice: Subject to any disclaimer, the term of this patent is extended or adjusted under 35 U.S.C. 154(b) by 0 days.

(21) Appl. No.: 17/617,021

(22) PCT Filed: Dec. 4, 2020

(86) PCT No.: PCT/CN2020/133751
§ 371 (c)(1),
(2) Date: Dec. 7, 2021

(87) PCT Pub. No.: WO2022/110272
PCT Pub. Date: Jun. 2, 2022

(65) Prior Publication Data
US 2023/0278702 A1    Sep. 7, 2023

(30) Foreign Application Priority Data
Nov. 26, 2020   (CN) .......................... 202011341881.5

(51) Int. Cl.
*B64C 27/10*   (2023.01)
*B64C 3/10*    (2006.01)
(Continued)

(52) U.S. Cl.
CPC ................ *B64C 27/10* (2013.01); *B64C 3/10* (2013.01); *B64C 27/14* (2013.01); *B64C 27/467* (2013.01)

(58) Field of Classification Search
CPC ....... B64C 27/10; B64C 27/14; B64C 27/467; B64C 27/024; B64C 27/025; B64C 3/10
See application file for complete search history.

(56) References Cited

U.S. PATENT DOCUMENTS 6,497,385 B1 *  12/2002  Wachspress ............ B64C 27/28
                                                    416/223 R
2010/0003133 A1 *  1/2010  Welsh ..................... B64C 27/10
                                                    416/31
(Continued)

OTHER PUBLICATIONS

Machine translation of reference Niu, (CN Pub No. 103935515 A) Pub date Jul. 23, 2014 (Year: 2014).*

*Primary Examiner* — Rodney A Bonnette

(57) ABSTRACT

The present disclosure relates to the technical field of air vehicles, and in particular, an air vehicle with a double-layer rotor wing structure, including a cabin in which a power device is arranged, the power device includes a drive assembly, a crankwheel, and a connecting link; the connecting link is fixed on the crankwheel; the drive assembly drives the crankwheel to rotate; the top of the cabin is provided with a flying device that includes a first flying unit and a second flying unit; the first flying unit includes a sleeve, a rotating bearing II, and lower-layer rotor wings symmetrically fixed on two sides of the rotating bearing II; the rotating bearing II is fixed to the sleeve which is fixed to the cabin; the second flying unit includes a transmission rod, a rotating bearing I, and upper-layer rotor wings symmetrically fixed on two sides of the rotating bearing I.

10 Claims, 4 Drawing Sheets

(51) Int. Cl.
     *B64C 27/14*      (2006.01)
     *B64C 27/467*     (2006.01)

(56) References Cited

U.S. PATENT DOCUMENTS

| | | | |
|---|---|---|---|
| 2016/0318605 A1* | 11/2016 | Gmirya | B64C 27/82 |
| 2019/0152594 A1* | 5/2019 | Fraundorfer | B64C 27/467 |
| 2020/0156776 A1* | 5/2020 | Tillotson | B64C 27/06 |

* cited by examiner

AIR VEHICLE WITH DOUBLE-LAYER ROTOR WING STRUCTURE

TECHNICAL FIELD

The present disclosure relates to the technical field of air vehicles, and in particular, to an air vehicle with a double-layer rotor wing structure.

BACKGROUND ART

A lift device of an air vehicle is a device built based on principles of aerodynamics. Based on its structure, the lift device can be divided into a fixed wing and a rotor wing. A fixed-wing air vehicle generally has a fuselage and symmetrical fixed wings and is powered by a propeller to obtain a higher flight speed and mobility. The principle of its flight is that there is a relative speed between the fixed wing and air, and the air interacts with each surface of the fixed wing to generate a lift so that the air vehicle can gain flight capability. The defect of the fixed-wing air vehicle is that it cannot hover in the air and needs to taxi before take off or after landing on a runway. Airport facilities have to be constructed for those devices. A rotor-wing air vehicle, such as a helicopter, does not need a runway when taking off and can hover in the air. Its power system includes an engine and rotor wings. The engine drives the rotor wings to rotate to generate a downward acting force that is the lift overcoming the gravity to make the air vehicle fly off the ground. The rotor-wing air vehicle have the defects of low cruising speed, low load capacity, and low efficiency, but little dependence on ground facilities.

A gyroplane is an air vehicle that combines fixed wings and rotor wings, and structurally includes rotor wings, a wheeled landing gear, and a propeller. The propeller drives the gyroplane to taxi on the runway. During the taxiing, the air and a rotor wing blade interact with each other. Air pushes the rotor wing blade to rotate, and the rotation of the rotor wing blade generates an acting force with respect to a taxiing direction. When the rotation speed of the rotor wing blade is high enough, the acting force causes the air vehicle to take off for flight. The gyroplane has the advantage of low runway requirement, but it still requires some taxiing distance. Moreover, the gyroplane cannot hover in the air, thus with a limited range of applications. Therefore, the existing technology needs to be improved and developed.

SUMMARY

For the above problems, the present disclosure provides an air vehicle with a double-layer rotor wing structure, which effectively solves the deficiencies of the existing art.

In order to achieve the above purpose, the technical solution of the application of the present disclosure is as follows:

An air vehicle with a double-layer rotor wing structure includes a cabin in which a power device is arranged. The power device includes a drive assembly, a crankwheel, and a connecting link; the connecting link is fixed on the crankwheel; the drive assembly drives the crankwheel to rotate; the top of the cabin is provided with a flying device that includes a first flying unit and a second flying unit; the first flying unit includes a sleeve, a rotating bearing II, and lower-layer rotor wings symmetrically fixed on two sides of the rotating bearing II; the rotating bearing II is fixed to the sleeve which is fixed to the cabin; the second flying unit includes a transmission rod, a rotating bearing I, and upper-layer rotor wings symmetrically fixed on two sides of the rotating bearing I; the rotating bearing I is fixed at the upper end of the transmission rod; the lower end of the transmission rod passes through the sleeve and is hinged to the connecting link; the transmission rod and the sleeve are connected through a linear bearing; the drive assembly drives the transmission rod to vertically move up and down in the sleeve so that a relative opening and closing motion is generated between the upper-layer rotor wings and the lower-layer rotor wings; and the tail of the cabin is provided with a propulsion device used for controlling the air vehicle to fly forwards.

According to the above solution, the structure of the lower-layer rotor wing is the same as that of the upper-layer rotor wing; an upper side plane of the lower-layer rotor wing is a turbulent flow airfoil, and a lower side plane is a flap airfoil; the turbulent flow airfoil is formed by connecting a front curved surface with a rear smooth surface; the front curved surface of the turbulent flow airfoil protrudes upwards relative to a rotation plane of the rotor wing; and the turbulent flow airfoil and the flap airfoil are of an asymmetric structure on a longitudinal projection plane.

According to the above solution, leading edges of the turbulent flow airfoil and the flap airfoil are closed to form a forewing edge, and trailing edges of the turbulent flow airfoil and the flap airfoil are closed to form a rear wing tail; and a wingspan meridian H where the highest arch point of the front curved surface of the turbulent flow airfoil is located is close to the forewing edge.

According to the above solution, an attack angle C exists between the flap airfoil and the rotation plane of the rotor wing, and C ranges from −2 degrees to 6 degrees.

According to the above solution, the drive assembly includes a human-powered unit that is connected to the crankwheel through a transmission structure.

According to the above solution, the drive assembly includes a power-driven unit that is connected to the crankwheel through a transmission structure.

According to the above solution, the drive assembly includes a human-powered unit and a power-driven unit which are respectively connected to the crankwheel through a transmission structure.

According to the above solution, a seat and a joystick are arranged in the cabin; the joystick is connected to the rotating bearing II through a connection rod assembly; the connection rod assembly includes a connection rod I and a connection rod II; the joystick is connected to the connection rod I; the connection rod I is connected to the connection rod II; and the connection rod II is connected to the rotating bearing II.

According to the above solution, the propulsion device includes a connection rod, a drive motor, and an empennage; the connection rod is fixed to the tail of the cabin; the drive motor and the empennage are fixed to the connection rod; and the drive motor drives the empennage to rotate.

According to the above solution, the bottom of the cabin is provided with a landing gear that includes a sled type landing gear.

The present disclosure has the following beneficial effects:

By the adoption of such structural arrangement, in the present disclosure, the drive assembly drives the crankwheel to rotate; under the driving of the crankwheel and the limitation effect of the sleeve, the transmission rod is pulled to vertically move up and down in a reciprocating manner in the sleeve, thus driving the rotating bearing I and the upper-layer rotor wings on the two sides of the rotating bearing I to vertically move up and down in a reciprocating manner, so that the upper-layer rotor wings rotate circumferentially around the rotating bearing I and will rotate faster and faster with the up-and-down reciprocating motion. When a certain rotating speed is achieved, a lift can be generated, thus achieving an effect that the air vehicle takes off vertically. The present disclosure has a simple and compact structure and low cost.

Figure 1:
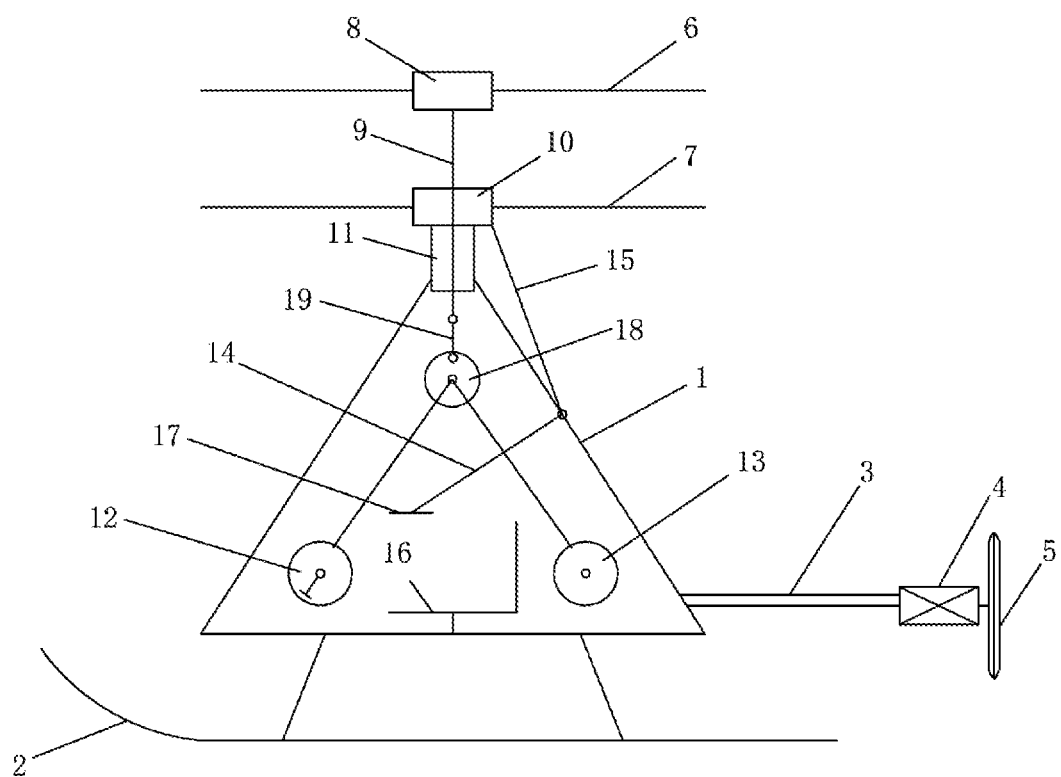
FIG. 1 is a schematic diagram of an entire structure of the present disclosure.

In the drawings: 1: cabin; 2: landing gear; 3: connection rod; 4: drive motor; 5: empennage; 6: upper-layer rotor wing; 7: lower-layer rotor wing; 8: rotating bearing I; 9: transmission rod; 10: rotating bearing II; 11: sleeve; 12: human-powered unit; 13: power-driven unit; 14: connection rod I; 15: connection rod II; 16: seat; 17: joystick; 18: crankwheel; 19: connecting link; 20: turbulent flow airfoil; 21: flap airfoil; 22: forewing edge; 23: rear wing tail; 24: linear bearing.

DETAILED DESCRIPTION OF THE EMBODIMENTS

The technical solutions of the present disclosure are described below in detail in combination with accompanying drawings and specific embodiments.

Embodiment I

Figure 2:
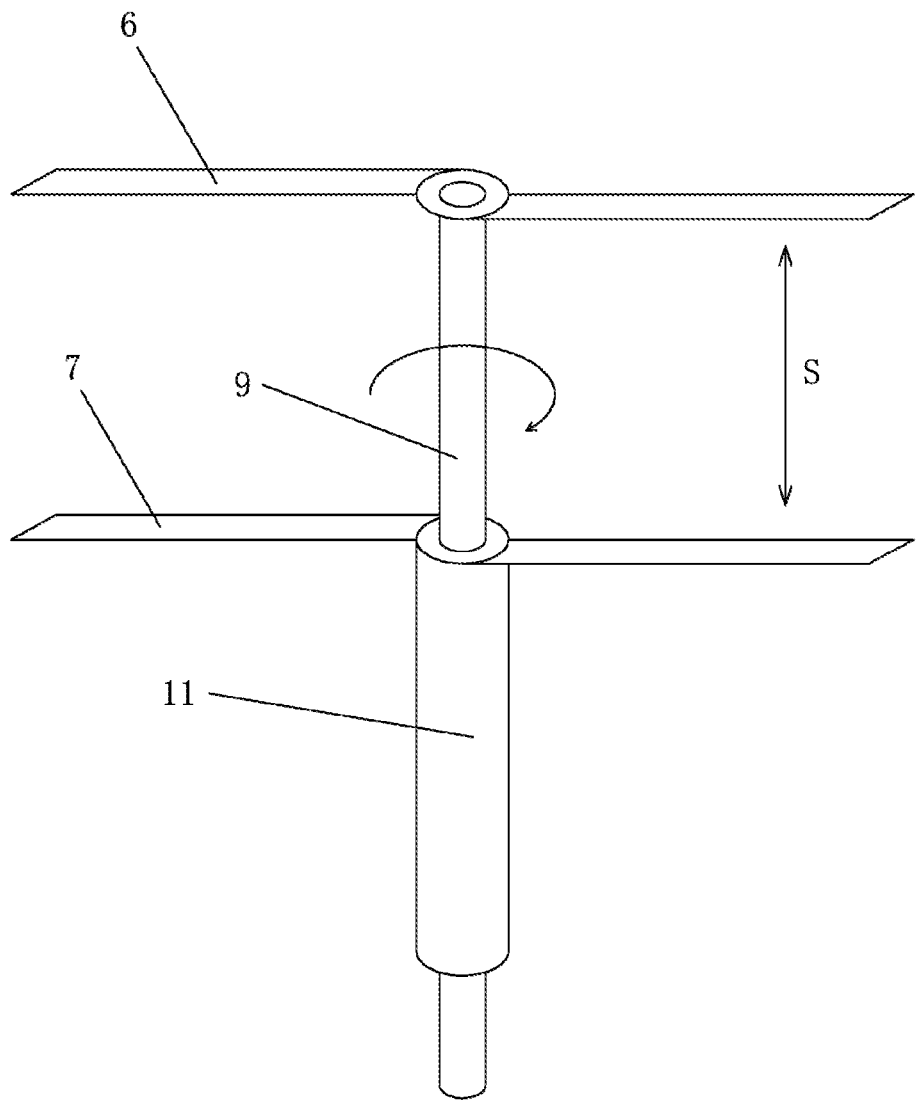
FIG. 2 is a schematic diagram of an operating state of a flying device of the present disclosure.
Figure 3:
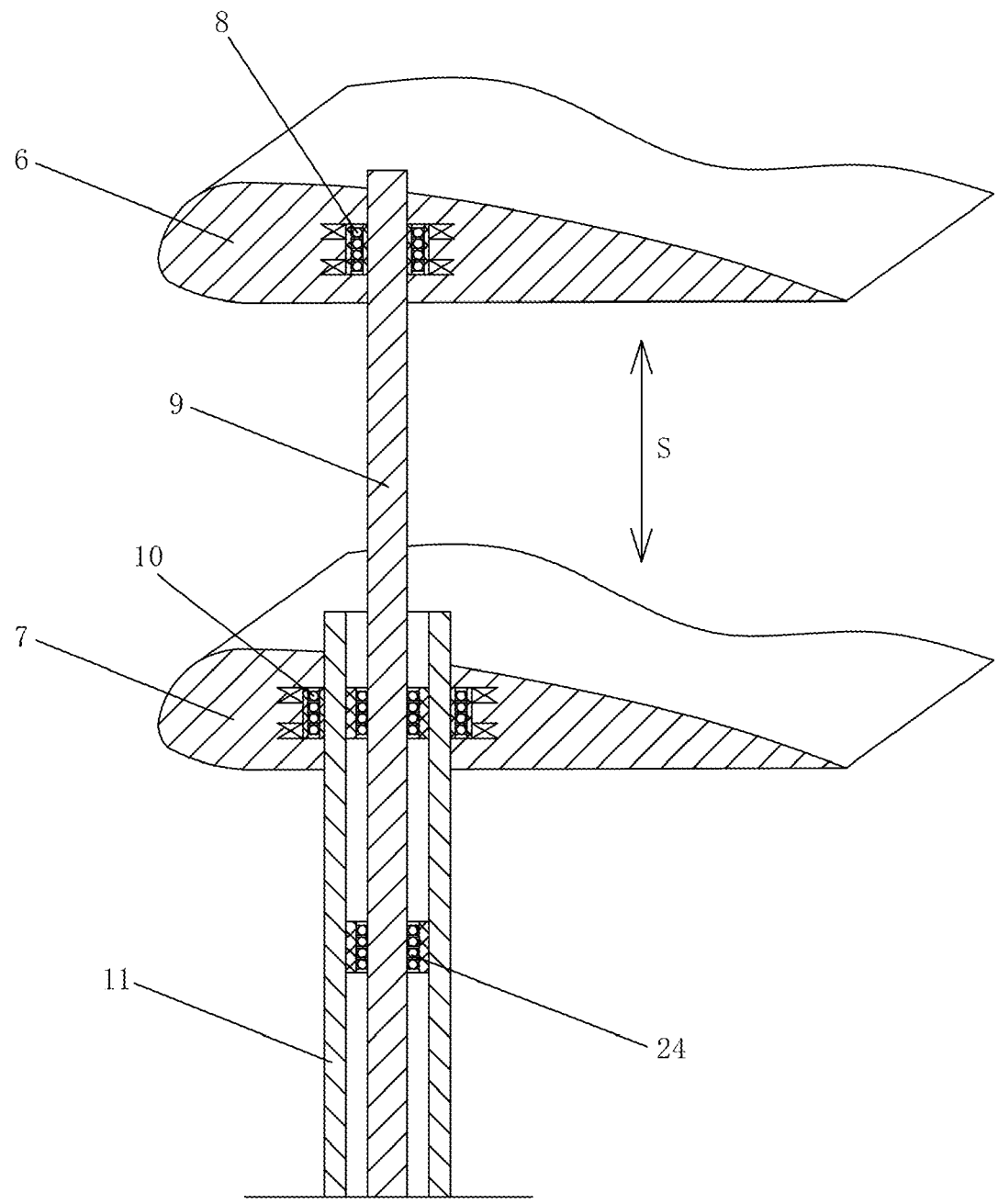
FIG. 3 is a sectional view of a flying device of the present disclosure.

As shown in FIG. 1 to FIG. 4, an air vehicle with a double-layer rotor wing structure of the present disclosure includes a cabin 1 in which a power device is arranged. The power device includes a drive assembly, a crankwheel 18, and a connecting link 19; the connecting link 19 is fixed on the crankwheel 18; the drive assembly drives the crankwheel 18 to rotate; the top of the cabin 1 is provided with a flying device that includes a first flying unit and a second flying unit; the first flying unit includes a sleeve 11, a rotating bearing II 10, and lower-layer rotor wings 7 symmetrically fixed on two sides of the rotating bearing II 10; the rotating bearing II 10 is fixed to the sleeve 11 which is fixed to the cabin 1; the second flying unit includes a transmission rod 9, a rotating bearing I 8, and upper-layer rotor wings 6 symmetrically fixed on two sides of the rotating bearing I 8; the rotating bearing I 8 is fixed at the upper end of the transmission rod 9; the lower end of the transmission rod 9 passes through the sleeve 11 and is hinged to the connecting link 19; the transmission rod 9 and the sleeve 11 are connected through a linear bearing 24. As shown in FIGS. 2-3, the S direction illustrated is a movement direction of the transmission rod 9. The drive assembly drives the transmission rod 9 to vertically move up and down along the S direction in the sleeve 11 so that a relative opening and closing motion is generated between the upper-layer rotor wings 6 and the lower-layer rotor wings 7; and the tail of the cabin 1 is provided with a propulsion device used for controlling the air vehicle to fly forwards. The above forms the basic structure of the present disclosure.

By the adoption of such structural arrangement, in the present disclosure, the drive assembly drives the crankwheel 18 to rotate; under the driving of the crankwheel 18 and the limitation effect of the sleeve 11, the transmission rod 9 is pulled to vertically move up and down in a reciprocating manner in the sleeve 11, thus driving the rotating bearing I 8 and the upper-layer rotor wings 6 on the two sides of the rotating bearing I 8 to vertically move up and down in a reciprocating manner, so that the upper-layer rotor wings 6 rotate circumferentially around the rotating bearing I 8 and will rotate faster and faster with the up-and-down motion. When a certain rotating speed is achieved, a lift can be generated, thus achieving an effect that the air vehicle takes off vertically. The present disclosure has a simple and compact structure and low cost.

In one embodiment, the structure of the lower-layer rotor wing 7 is the same as that of the upper-layer rotor wing 6; an upper side plane of the lower-layer rotor wing is a turbulent flow airfoil 20, and a lower side plane is a flap airfoil 21; the turbulent flow airfoil 20 is formed by connecting a front curved surface with a rear smooth surface; the front curved surface of the turbulent flow airfoil 20 protrudes upwards relative to a rotation plane of the rotor wing; and the turbulent flow airfoil 20 and the flap airfoil 21 are of an asymmetric structure on a longitudinal projection plane. By the adoption of such structural arrangement, the drive assembly drives the transmission rod 9 to vertically move up and down in the reciprocating manner in the sleeve 11. When the upper-layer rotor wing 6 goes up, its turbulent flow airfoil 20 interacts with air above, and the air generates a pressure difference between the front curved surface and the rear smooth surface of the turbulent flow airfoil 20. The pressure difference pushes the upper-layer rotor wing 6 to move forwards so that the upper-layer rotor wing 6 rotates in one direction around the rotating bearing I 8 serving as a center. When the upper-layer rotor wing 6 goes down, its flap airfoil 21 interacts with air below. The rotation of the upper-layer rotor wing 6 is combined with the down-going motion to enable the flap airfoil 21 to form a vector attack angle C which generates a vertically upward acting force between the flap airfoil 21 and the air. The upper-layer rotor wing 6 converts the up-and-down reciprocating motion of the drive assembly into its own rotation motion and will rotate faster and faster with the up-and-down reciprocating motion. When a certain rotation speed is achieved, a lift is generated, and the flying device obtains the lift to achieve the flying purpose. Since the relative opening and closing motion is generated between the upper-layer rotor wing 6 and the lower-layer rotor wing 7, the lower-layer rotor wing 7 is driven to rotate in one direction around the rotating bearing II 10 serving as a center, and the lift effect can be enhanced.

Figure 4:
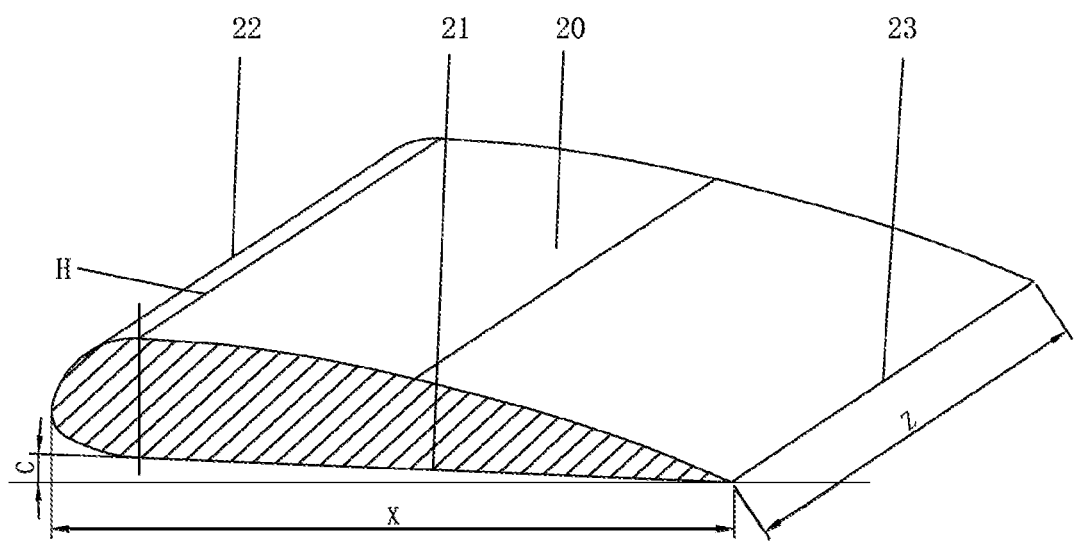
FIG. 4 is a sectional view of a rotor wing of the present disclosure.

In this embodiment, leading edges of the turbulent flow airfoil 20 and the flap airfoil 21 are closed to form a forewing edge 22, and trailing edges of the turbulent flow airfoil 20 and the flap airfoil 21 are closed to form a rear wing tail 23; and a wingspan meridian H where the highest arch point of the front curved surface of the turbulent flow airfoil 20 is located is close to the forewing edge 22. By the adoption of such structural arrangement, the forewing edge 22 is a curved surface, so as to be respectively connected to the leading edges of the turbulent flow airfoil 20 and the flap airfoil 21. The existence of the forewing edge 22 can improve the structural strength of the airfoil rotor wing, and the forewing edge 22 is located on the front side of the rotation direction of the rotor wing. The curved forewing edge 22 can reduce the air resistance during the rotation of the rotor wing and improve the power conversion efficiency of the drive device. As shown in FIG. 4, the X direction illustrated is a span direction of the airfoil structure, and the Z direction illustrated is an elongation direction of the airfoil structure. A contour line of a section of the turbulent flow airfoil 20 along the X direction is a curved line relative to the rotation plane of the rotor wing, and the highest point of the contour line forms the wingspan meridian H along the Z direction. The wingspan meridian H is located on the front curved surface of the turbulent flow airfoil 20 and close to the forewing edge 22 so that the turbulent flow airfoil 20 is of an anteroposterior asymmetric structure. When the rotor wing goes up, the turbulent flow airfoil 20 interacts with the air above, and the air generates a pressure difference between the front and rear sides of the wingspan meridian H of the turbulent flow airfoil 20. The pressure difference pushes the rotor wing to move forwards so that the two kinds of rotor wings work in the same direction and rotate in one direction around the rotating bearings serving as the centers.

In this embodiment, an attack angle C exists between the flap airfoil 21 and the rotation plane of the rotor wing, and C ranges from −2 degrees to 6 degrees. The rotor wing has one attack angle C on the rotating bearing. The attack angle C is calculated by the flap airfoil 21 relative to the rotation plane of the rotor wing. The rotor wing moves up and down in the reciprocating manner after being turned on. The turbulent flow airfoil 20 moves upwards. The air flows through the turbulent flow airfoil 20 to generate a pressure difference between the front and rear sides of the wingspan meridian H. The pressure difference applies a forward push force to the rotor wing to make the rotor wing to rotate. At this time, the forewing edge 22 generates a differential speed relative to the air, thus generating resistance to the rotor wing, and the push force overcomes the resistance to drive the rotor wing to rotate. The flap airfoil 21 moves downwards. When the rotation speed of the rotor wing is extremely low, the attack angle C enables the acting force of the air relative to the flap airfoil 21 to be basically perpendicular to the rotation plane of the rotor wing, and the lower air causes extremely low resistance to the forward rotation motion. Therefore, the rotor wing can obtain a relatively high rotation speed after a period of time of the up-and-down reciprocating motion. When the rotation speed of the rotor wing is relatively high, the flap airfoil 21 does both the downward motion and the forward motion. A vector angle of the vector motion superposed by the two motions relative to the rotation plane of the rotor wing is greater than the attack angle C. That is, if the rotation speed of the rotor wing is higher, the lift generated by the flap airfoil 21 is higher. By means of controlling the up-and-down motion frequency of the rotor wing, the rotation speed of the rotor wing can be increased, and the lift generated by the rotor wing is changed.

In this embodiment, the drive assembly includes a human-powered unit 12 that is connected to the crankwheel 18 through a transmission structure. By the adoption of the structural arrangement, a driver manually controls the human-powered unit 12 to act so that the human-powered unit drives the crankwheel 18 to rotate, and the cost is extremely low.

In this embodiment, a seat 16 and a joystick 17 are arranged in the cabin 1; the joystick 17 is connected to the bearing II 10 through a connection rod assembly; the connection rod assembly includes a connection rod I 14 and a connection rod II 15; the joystick 17 is connected to the connection rod I 14; the connection rod I 14 is connected to the connection rod II 15; and the connection rod II 15 is connected to the bearing II 10. By the adoption of such structural arrangement, the bearing II 10 is finely adjusted by means of the joystick 17, thus controlling the flight attitude of the air vehicle.

In this embodiment, the tail of the cabin 1 is provided with a monopropellant device that includes a connection rod 3, a drive motor 4, and an empennage 5; the connection rod 3 is fixed to the tail of the cabin 1; the drive motor 4 and the empennage 5 are fixed to the connection rod 3; and the drive motor 4 drives the empennage 5 to rotate. By the adoption of such structural arrangement, the drive motor 4 drives the empennage 5 to rotate, which can provide a thrust to the air vehicle to make the air vehicle to have a forward flight.

In actual application, the drive motor 4 drives the empennage 5 to rotate, so that when the air vehicle flies forwards, the flying device of the air vehicle will generate a back chamfer and cause an unsteady state, which is equivalent to a gyroplane function. At this time, the bearing II 10 can be finely adjusted by means of the joystick 17, thus adjusting the back chamfer of the flying device.

In this embodiment, the bottom of the cabin 1 is provided with a landing gear 2 that includes a sled type landing gear. By the adoption of such structural arrangement, a support effect during take-off and a buffer effect during landing are achieved.

Embodiment II

In another embodiment, the drive assembly includes a power-driven unit 13 that is connected to the crankwheel 18 through a transmission structure. By the adoption of such structural arrangement, the power-driven unit 13 drives the crankwheel 18 to rotate, so that labor can be saved.

Except the drive assembly, other structures and the working principle of this embodiment II are the same as those in Embodiment I, and no repeated descriptions will be made.

Embodiment III

In another embodiment, the drive assembly includes a human-powered unit 12 and a power-driven unit 13 which are respectively connected to the crankwheel 18 through a transmission structure. By the adoption of such structural arrangement, the crankwheel 18 can be driven alone by the human-powered unit 12 or the power-driven unit 13 to rotate, or can be driven by both the human-powered unit 12 and the power-driven unit 13 to rotate. Functional diversification is achieved.

Except the drive assembly, other structures and the working principle of this embodiment III are the same as those in Embodiment I, and no repeated descriptions will be made.

The technical solutions in the embodiments of the present disclosure have been described above, but the present disclosure is not limited to the above-mentioned specific implementation modes. The above-mentioned specific implementation modes are only schematic, not restrictive. Those of ordinary skill in the art may make many forms without departing from the scope of the present disclosure and the scope of the claims under the enlightenment of the present disclosure. These forms shall fall within the protection scope of the present disclosure.

The invention claimed is:
1. An air vehicle with a double-layer rotor wing structure, comprising a cabin (1), a power device arranged in the cabin (1), and wherein the power device further comprising a drive assembly, a crankwheel (18), and a connecting link (19); wherein the connecting link (19) is fixed on the crankwheel

(18); wherein the drive assembly drives the crankwheel (18) to rotate; wherein top of the cabin (1) is provided with a flying device further comprising a first flying unit and a second flying unit; wherein the first flying unit further comprising a sleeve (11), a first rotating bearing (10), and lower-layer rotor wings (7) symmetrically fixed on two sides of the first rotating bearing (10); wherein the first rotating bearing (10) is fixed to the sleeve (11) which is fixed to the cabin (1); wherein the second flying unit further comprising a transmission rod (9), a second rotating bearing (8), and upper-layer rotor wings (6) symmetrically fixed on two sides of the second rotating bearing (8); wherein the second rotating bearing (8) is fixed at the upper end of the transmission rod (9); wherein the lower end of the transmission rod (9) passes through the sleeve (11) and is hinged to the connecting link (19); wherein the transmission rod (9) and the sleeve (11) are connected through a linear bearing (24); wherein the drive assembly drives the transmission rod (9) to vertically move up and down in the sleeve (11) so that a relative opening and closing motion is generated between the upper-layer rotor wings (6) and the lower-layer rotor wings (7); and wherein the tail of the cabin (1) is provided with a propulsion device used for controlling the air vehicle to fly forwards.

2. The air vehicle with the double-layer rotor wing structure according to claim 1, wherein the structure of the lower-layer rotor wing (7) is identical to the upper-layer rotor wing (6); wherein an upper side plane of the lower-layer rotor wing is a turbulent flow airfoil (20), and a lower side plane is a flap airfoil (21); wherein the turbulent flow airfoil (20) is formed by connecting a front curved surface with a rear smooth surface; wherein the front curved surface of the turbulent flow airfoil (20) protrudes upwards relative to a rotation plane of the rotor wing;

and wherein the turbulent flow airfoil (20) and the flap airfoil (21) are of an asymmetric structure on a longitudinal projection plane.

3. The air vehicle with the double-layer rotor wing structure according to claim 2, wherein leading edges of the turbulent flow airfoil (20) and the flap airfoil (21) are closed to form a forewing edge (22), and trailing edges of the turbulent flow airfoil (20) and the flap airfoil (21) are closed to form a rear wing tail (23); and wherein a wingspan meridian (H) where the highest arch point of the front curved surface of the turbulent flow airfoil (20) is located is close to the forewing edge (22).

4. The air vehicle with the double-layer rotor wing structure according to claim 2, wherein an attack angle (C) exists between the flap airfoil (21) and the rotation plane of the rotor wing, and wherein the attack angle (C) ranges from −2 degrees to 6 degrees.

5. The air vehicle with the double-layer rotor wing structure according to claim 1, wherein the drive assembly further comprising a human-powered unit (12), and wherein the human-powered unit (12) is connected to the crankwheel (18) through a transmission structure.

6. The air vehicle with the double-layer rotor wing structure according to claim 1, wherein the drive assembly further comprising a power-driven unit (13), and wherein the power-driven unit (13) is connected to the crankwheel (18) through a transmission structure.

7. The air vehicle with the double-layer rotor wing structure according to claim 1, wherein the drive assembly further comprising a human-powered unit (12) and a power-driven unit (13), and wherein the human-powered unit (12) and the power-driven unit (13) are respectively connected to the crankwheel (18) through a transmission structure.

8. The air vehicle with the double-layer rotor wing structure according to claim 1, wherein a seat (16) and a joystick (17) are arranged in the cabin (1); wherein the joystick (17) is connected to the first rotating bearing (10) through a connection rod assembly; wherein the connection rod assembly comprises a first connection rod (14) and a second connection rod (15); wherein the joystick (17) is connected to the first connection rod (14); wherein the first connection rod (14) is connected to the second connection rod (15); and wherein the second connection rod (15) is connected to the first rotating bearing (10).

9. The air vehicle with the double-layer rotor wing structure according to claim 1, wherein the propulsion device further comprising a connection rod (3), a drive motor (4), and an empennage (5); wherein the connection rod (3) is fixed to the tail of the cabin (1); wherein the drive motor (4) and the empennage (5) are fixed to the connection rod (3); and wherein the drive motor (4) drives the empennage (5) to rotate.

10. The air vehicle with the double-layer rotor wing structure according to claim 1, wherein the bottom of the cabin (1) is provided with a landing gear (2), and the landing gear (2) further comprising a sled type landing gear.

* * * * *